United States Patent
Ashjaee et al.

(10) Patent No.: US 9,671,497 B2
(45) Date of Patent: Jun. 6, 2017

(54) SYNCHRONIZATION USING MULTIPLE OFFSET GNSS RECEIVER CHANNELS

(71) Applicant: JAVAD GNSS, Inc., San Jose, CA (US)

(72) Inventors: Javad Ashjaee, Saratoga, CA (US); Sergey Yudanov, Moscow (RU)

(73) Assignee: JAVAD GNSS, INC., San Jose, CA (US)

( * ) Notice: Subject to any disclaimer, the term of this patent is extended or adjusted under 35 U.S.C. 154(b) by 469 days.

(21) Appl. No.: 14/274,317

(22) Filed: May 9, 2014

(65) Prior Publication Data

US 2015/0323676 A1    Nov. 12, 2015

(51) Int. Cl.
   *G01S 19/22*    (2010.01)
   *G01S 19/24*    (2010.01)

(52) U.S. Cl.
   CPC ............ *G01S 19/243* (2013.01); *G01S 19/22* (2013.01); *G01S 19/24* (2013.01)

(58) Field of Classification Search
   CPC ......... G01S 19/22; G01S 19/24; G01S 19/243
   USPC .................................................... 342/357.61
   See application file for complete search history.

(56) References Cited

U.S. PATENT DOCUMENTS

| | | | |
|---|---|---|---|
| 6,407,699 B1 * | 6/2002 | Yang ....................... | G01S 19/21 342/357.59 |
| 6,684,158 B1 * | 1/2004 | Garin .................... | G01S 5/0009 342/352 |
| 8,022,868 B2 | 9/2011 | Yudanov et al. | |
| 8,094,087 B2 | 1/2012 | Ashjaee et al. | |
| 8,120,527 B2 | 2/2012 | Ashjaee et al. | |
| 8,125,376 B1 | 2/2012 | Ashjaee et al. | |
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,717,232 B2 | 5/2014 | Ashjaee et al. | |
| 8,717,233 B2 | 5/2014 | Ashjaee et al. | |
| 8,872,700 B2 | 10/2014 | Ashjaee et al. | |
| 2011/0075886 A1 | 3/2011 | Ashjaee et al. | |
| 2011/0231057 A1 | 9/2011 | Ashjaee et al. | |
| 2012/0229333 A1 | 9/2012 | Ashjaee et al. | |
| 2012/0299936 A1 | 11/2012 | Ashjaee et al. | |
| 2013/0080051 A1 | 3/2013 | Gribkov et al. | |
| 2013/0113571 A1 | 5/2013 | Ashjaee et al. | |
| 2014/0062778 A1 | 3/2014 | Ashjaee et al. | |

* cited by examiner

*Primary Examiner* — Harry Liu
(74) *Attorney, Agent, or Firm* — Morrison & Foerster LLP

(57) ABSTRACT

Systems and methods for synchronizing a global navigation satellite system (GNSS) receiver with a GNSS signal are provided. In one example, a GNSS receiver may include one or more sets of 20 GNSS channels that are each configured to integrate a received GNSS signal over a 20 millisecond accumulation window to output a navigation message bit. The accumulation windows of the 20 GNSS channels may be delayed relative to other windows of the 20 GNSS channels by 1 millisecond. The GNSS receiver may identify one of the 20 GNSS channels having the correct synchronization with the GNSS signal based on the navigation message bits output by the 20 GNSS channels. The identified GNSS channel having the correct synchronization with the GNSS signal may be used to determine a location of the GNSS receiver.

18 Claims, 6 Drawing Sheets

SYNCHRONIZATION USING MULTIPLE OFFSET GNSS RECEIVER CHANNELS

BACKGROUND

1. Field

The present disclosure relates to Global Navigation Satellite System (GNSS) devices and, more specifically, to synchronizing a GNSS receiver with a GNSS signal using multiple offset GNSS channels.

3. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

For example, a GPS signal may include two pseudo-noise ("PN") code components: a coarse/acquisition (C/A) code and a precision code (P-code) residing on orthogonal carrier components, which may be used by a GNSS receiver to determine the position of the receiver. In particular, a GPS signal may include a first a carrier signal (referred to as the "L1 signal") having a frequency of 1575.42 MHz and a second carrier signal (referred to as the "L2 signal") having a frequency of 1227.60 MHz and that is in quadrature with the first carrier signal. A 1023 bit C/A code may be transmitted on the L1 signal as a 1.023 MHz signal and a $6.1872*10^{12}$ bit P-code may be transmitted on both the L1 and L2 signals. Additionally, a 1500 bit navigation message that includes information, such as GPS data and time, satellite status and health, ephemeris data, and the almanac, and that may be used by the GNSS receiver to determine the position of the receiver may modulated over both the C/A code and P-code and transmitted at 50 bits/s. Thus, the C/A code sample sequence is transmitted for a length of time that is different than that of the navigation message data bits. In particular, each C/A code sequence is transmitted for 1 millisecond, while each bit of the navigation message is transmitted for 20 milliseconds.

In order to detect a navigation message bit, an integration function may be performed over 20 consecutive C/A code sequences. However, since the timing of the C/A code sequence is different than the timing of the navigation message data bits, conventional GNSS receivers must determine the exact positions of the navigation message bit-edges (e.g., the C/A code sequence corresponding to the start/end of the navigation message bit) in order to correctly integrate the appropriate C/A code sequences to detect the individual navigation message data bits.

One bit synchronization method that may be used for detecting navigation message bit-edges includes the use of a histogram. In this method, each C/A code sequence may be sequentially assigned to one of 20 bins. The C/A code sequences may be monitored to detect a sign change between adjacent C/A code sequences. In response to a detected sign change, a count of the bin corresponding to the C/A code sequence experiencing the sign change may be incremented. When a count of one of the 20 bins reaches a threshold value, the C/A code sequence associated with the bin may be determined to be the C/A code sequence corresponding to the start of a navigation message bit.

Another conventional bit synchronization method for detecting navigation message bit-edges includes integrating the GPS signal over all possible start/end points and then comparing the power detected in each possible segment. Since there are 20 C/A code sequences per navigation message bit, there are 20 possible bit-edge timing possibilities over which to integrate.

While such bit synchronization methods may be used to successfully detect navigation message bit-edges, their use may result in slow processing of the navigation message and may result in poor performance when applied to signals having low signal-to-noise ratios.

BRIEF SUMMARY

Systems and methods for synchronizing a global navigation satellite system (GNSS) receiver with a GNSS signal are provided. In one example, a GNSS receiver may include one or more sets of 20 GNSS channels that are each configured to integrate a received GNSS signal over a 20 millisecond accumulation window to output a navigation message bit. The accumulation windows of the 20 GNSS channels may be delayed relative to other windows of the 20 GNSS channels by 1 millisecond. The GNSS receiver may identify one of the 20 GNSS channels having the correct synchronization with the GNSS signal based on the navigation message bits output by the 20 GNSS channels. The identified GNSS channel having the correct synchronization with the GNSS signal may be used to determine a location of the GNSS receiver.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Systems and methods for synchronizing a global navigation satellite system (GNSS) receiver with a GNSS signal are provided. In one example, a GNSS receiver may include one or more sets of 20 GNSS channels that are each configured to integrate a received GNSS signal over a 20 millisecond accumulation window to output a navigation message bit. The accumulation windows of the 20 GNSS channels may be delayed relative to other windows of the 20 GNSS channels by 1 millisecond. The GNSS receiver may identify one of the 20 GNSS channels having the correct synchronization with the GNSS signal based on the navigation message bits output by the 20 GNSS channels. The identified GNSS channel having the correct synchronization with the GNSS signal may be used to determine a location of the GNSS receiver.

Figure 1:
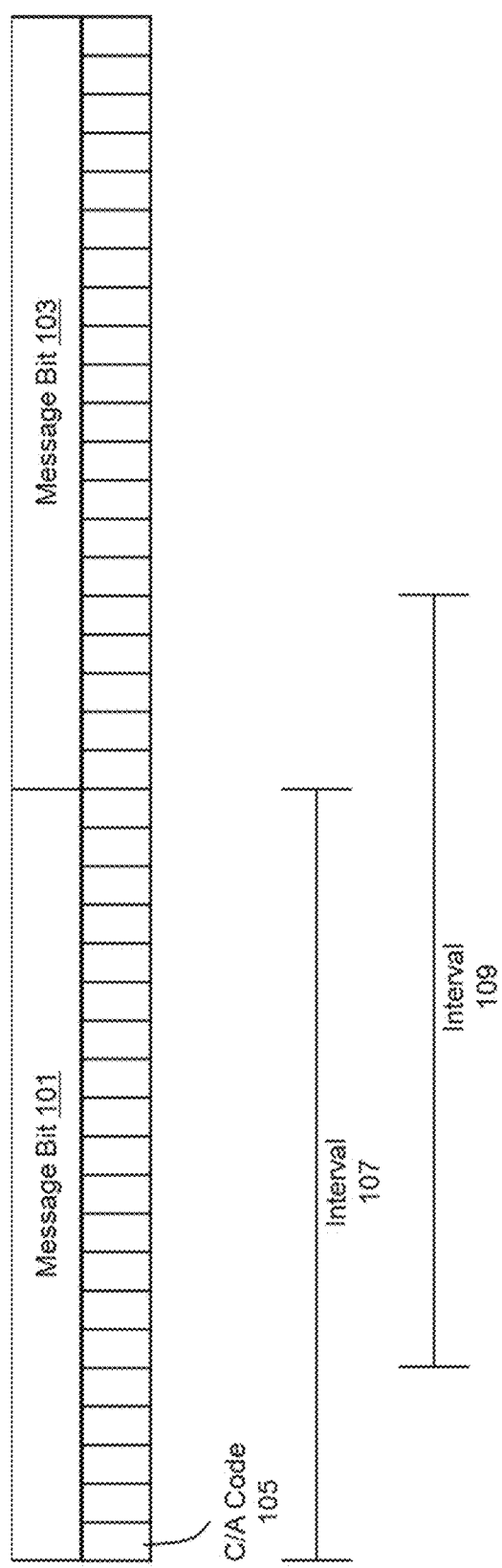
FIG. 1 illustrates a visual representation of the timing between navigation message bits and C/A code sequences of a GPS signal.

As mentioned above, navigation message bits may be modulated over both the C/A code and P-code components of a GPS signal. A C/A code sequence may be transmitted for 1 millisecond, while each bit of the navigation message may be transmitted for 20 milliseconds. FIG. 1 shows a visual representation of the timing between navigation message bits 101 and 103 and C/A code sequences 105. As shown, each navigation message bit corresponds to 20 C/A code sequences 105. Since the timing of the sample sequence (C/A code sequence) is different than the timing of the navigation message data bits, the exact positions of the navigation message bit-edges need to be determined in order to correctly integrate the appropriate C/A code sequences to detect the individual navigation message data bits. For example, the first 20 C/A code sequences 105 corresponding to time interval 107 would need to be integrated to correctly detect navigation message bit 101. If the navigation message bit-edges are incorrectly determined, C/A code sequences 105 from adjacent navigation message bits may erroneously be integrated and may result in errors in the navigation message detection. For example, if the navigation message bit-edges are incorrectly determined to correspond to time interval 109, the first 5 C/A code sequences 105 for the first navigation message bit 101 may be ignored, while the first 5 C/A code sequences 105 for the second navigation message bit 103 may be erroneously integrated.

Figure 2:
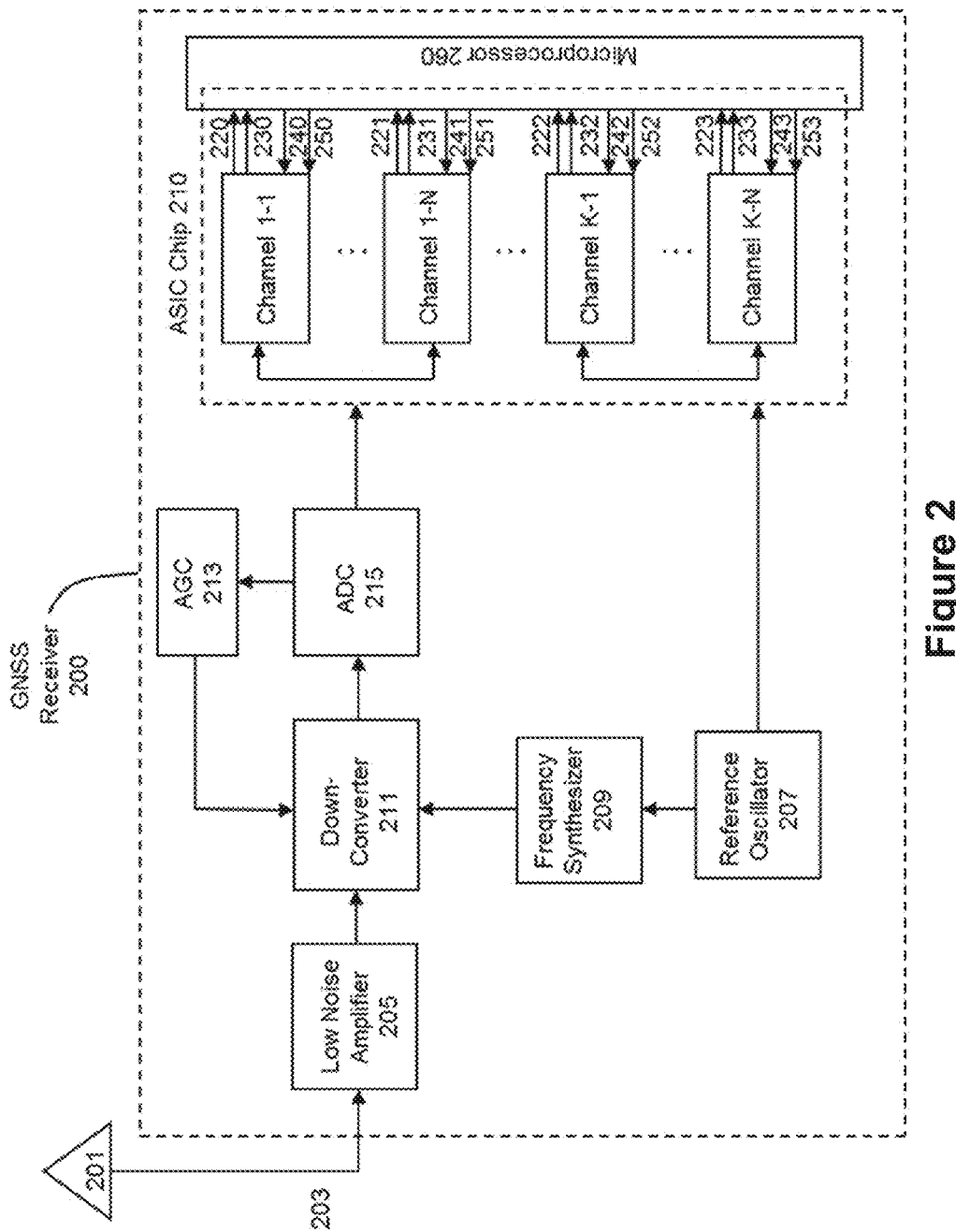
FIG. 2 illustrates a block diagram of an exemplary GNSS receiver according to various examples.

FIG. 2 illustrates a block diagram of an example GNSS receiver 200 that may be used to quickly synchronize with a GNSS signal according to various examples. GNSS receiver 200 may be coupled to receive GNSS signals 203 from GNSS antenna 201. GNSS signals 203 may include a GPS signal that is similar or identical to those described above with respect to FIG. 1. GNSS receiver 200 may include low noise amplifier 205 coupled to receive the GNSS signals 203 from GNSS antenna 201. Low noise amplifier 205 may be configured to amplify the received GNSS signals 203 before down-converter 211 down-converts the amplified GNSS signals to baseband or another intermediate frequency that depends on the entire receiver frequency plan design and available electronic components. Down-converter 211 may down-convert the amplified GNSS signals using mixing frequencies provided by reference oscillator 207 and frequency synthesizer 209. Automatic gain control (AGC) 213 may adjust the gain applied to the down-converted signals output by down-converter 211 to a suitable level while analog-to-digital converter (ADC) 215 may convert the down-converted GNSS signals to a digital signal by sampling multiple repetitions of the down-converted GNSS signals.

It should be appreciated that the configuration of low noise amplifier 205, down-converter 211, reference oscillator 207, frequency synthesizer 209, AGC 213, and ADC 215 is provided only as an example. GNSS receiver 200 may include other configurations of RF circuitry to filter, amplify, and down-convert GNSS signal 203 and to converter GNSS signal 203 into a digital signal as appropriate for a given application.

GNSS receiver 200 may further include K sets of N GNSS channels, such as the first set of GNSS channels containing GNSS channels 1-1 through 1-N, and the Kth set of GNSS channels containing GNSS channels K-1 through K-N. GNSS receiver 200 may include any desired number of sets of GNSS channels, where each set of the K sets of GNSS channels may be configured to receive and process signals from a different GNSS satellite. Thus, the number K sets of GNSS channels may determine the number of satellites that GNSS receiver 200 may track simultaneously. For reasons that are described in greater detail below, the K sets of GNSS channels may include N GNSS channels that are each configured to integrate the output of ADC 215 over a segment of time that is delayed relative to the segments of time of the other GNSS channels within the same set of GNSS channels. In some examples, each set of GNSS channels may include 20 GNSS channels (N=20), and each GNSS channel within a set of GNSS channels may be configured to integrate the output of ADC 215 over a segment of time that is delayed by 1 millisecond relative to the segments of time of the other GNSS channels within the same set of GNSS channels. In other words, each GNSS channel within a set of GNSS channels may have a different code offset that is offset by 1023 bits relative to the other GNSS channels within the same set of GNSS channels.

Each GNSS channel may be coupled to receive the digital output of ADC 215, a reference oscillator signal from reference oscillator 207, a frequency/phase control signal (e.g., signals 240-243), and a carrier frequency/phase control signal (e.g., 250-253). As discussed in greater detail below with respect to FIG. 3, the GNSS channels may output in-phase (I) and quadraphase (Q) signals, which are averaged signals of the phase loop discriminator (demodulator), as channel output vectors 220-223 along with inphase dI (derivative of Iphase) and quadriphase dQ (derivative of Quadriphase), which are the averaged signals of the code loop discriminator (demodulator), as channel output vectors 230-233. The GNSS channels may further output a possible navigation message bit (accumulation of the Iphase over a 20 millisecond window) to microprocessor 260. Microprocessor 260 may use output vectors 220-223 and 230-233 to determine the distance between the receiver and the GPS satellites and to generate code frequency/phase control signals 240-243 and carrier frequency/phase control signal 250-253. In some examples, the GNSS channels and microprocessor 260 may reside in an application specific integrated circuit ("ASIC") chip 210 along with the GNSS channels, or may be separate from the ASIC chip 210.

Figure 3:
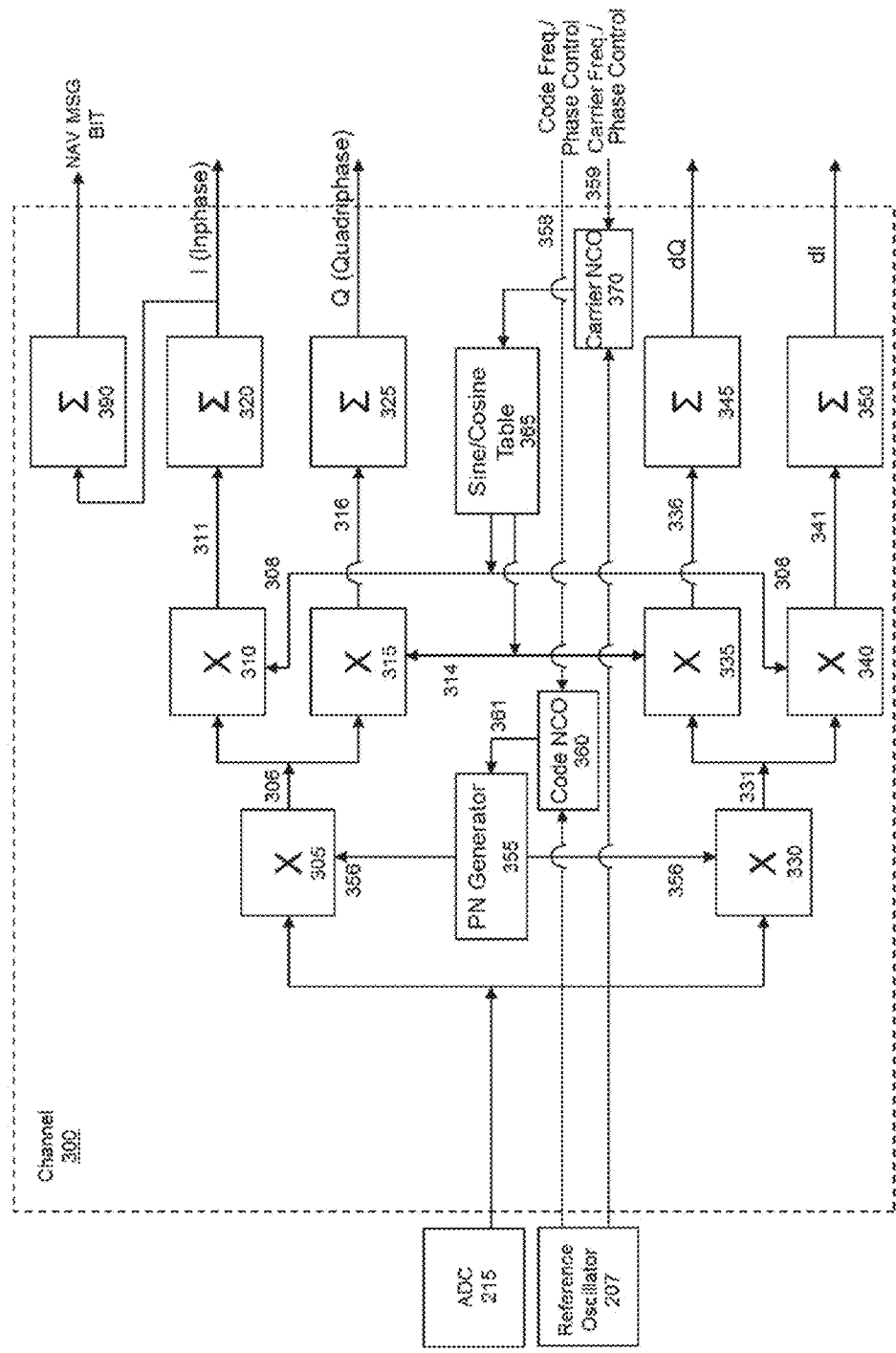
FIG. 3 illustrates a block diagram of an exemplary GNSS receiver channel according to various examples.

FIG. 3 illustrates an example block diagram of a GNSS channel 300 that may be used to implement any of the GNSS channels of GNSS receiver 200. GNNS channel 300 may include digital multipliers 305 and 330 coupled receive the digital output of ADC 215. Digital multipliers 305 and 330 may be configured to multiply the output of ADC 215 with a PN code signal 356 to generate correlator signal 306 and discriminator signal 331, respectively. Correlator signal 306 may represent the correlation between the incoming GNSS signal and the reference signal generated by PN generator 355. Discriminator signal 331 may represent the misalignment (error) between the incoming PN code embedded within the digital output of ADC 215 and the reference PN code generated by PN generator 355.

GNSS channel 300 may further include digital multiplier 310 coupled to receive correlator signal 306. Digital multiplier 310 may be configured to multiply correlator signal 306 with sine signal 308 to generate signal 311. Signal 311 may be sent to accumulation adder 320, which may be configured to add the incoming sequence of values to previously stored values from previous clock cycles. Thus, accumulation adder 320 may act as a digital filter on the correlator structure, averaging the incoming signal over a period of time. In one example, the period of time may be 1 millisecond. The output of accumulation adder 320 may be the I component of channel output vector (e.g., 220-223) provided to microprocessor 260.

GNSS channel 300 may further include digital multiplier 315 coupled to receive correlator signal 306. Digital multiplier 315 may be configured to multiply correlator signal 306 with cosine signal 314 to generate signal 316. Signal 316 may be sent to accumulation adder 325, which may be configured to add the incoming sequence of values to previously stored values from previous clock cycles. Thus, accumulation adder 325 may act as a digital filter on the correlator structure, averaging the incoming signal over a period of time. In one example, the period of time may be 1 millisecond. The output of accumulation adder 325 may be the Q component of channel output vector (e.g., 220-223) provided to microprocessor 260.

GNSS channel 300 may further include digital multiplier 335 coupled to receive discriminator signal 331. Digital multiplier 335 may be configured to multiply discriminator signal 331 with cosine signal 314 to generate signal 336. Signal 336 may be sent to accumulation adder 345, which may be configured to add the incoming sequence of values to previously stored values from previous clock cycles. Thus, accumulation adder 345 may act as a digital filter on the discriminator structure, averaging the incoming signal over a period of time. In one example, the period of time may be 1 millisecond. The output of accumulation adder 345 may be the dQ component of channel output vector (e.g., 230-233) provided to microprocessor 260.

GNSS channel 300 may further include digital multiplier 340 coupled to receive discriminator signal 331. Digital multiplier 340 may be configured to multiply discriminator signal 331 with sine signal 308 to generate signal 341. Signal 341 may be sent to accumulation adder 350, which may be configured to add the incoming sequence of values to previously stored values from previous clock cycles. Thus, accumulation adder 350 may act as a digital filter on the discriminator structure, averaging the incoming signal over a period of time. In one example, the period of time may be 1 millisecond. The output of accumulation adder 350 may be the dI component of channel output vector (e.g., 230-233) provided to microprocessor 260.

GNSS channel 300 may further include code NCO 360 coupled to receive a oscillator reference signal from reference oscillator 207 and code frequency/phase control signal 358 from microprocessor 160. Code NCO 360 may generate code NCO signal 361 to drive PN generator 355, which may then use NCO signal 361 to generate PN code signal 356.

GNSS channel 300 may further include numerically controlled oscillator 370 (carrier NCO) coupled to receive an oscillator reference signal from reference oscillator 207 and carrier frequency/phase control signal 359 from microprocessor 160. Carrier NCO 370 may generate carrier NCO signal 358, which may be provided to sine/cosine table 365 to generate a reference carrier signal having a desired frequency and phase. Sine/cosine table 365 may generate sine signal 308 and cosine signal 314 based on the received carrier NCO signal 358.

GNSS channel 300 may further include a navigation message accumulation adder 390 coupled to receive the Iphase component of the channel output vector generated by accumulation adder 320. Accumulation adder 390 may be configured to accumulate the values output by accumulation adder 320 over an accumulation window and to output a GPS navigation message bit to microprocessor 260. In order to correctly detect the bits of a GPS navigation message, the positions of the navigation message bit-edges need to be determined. As mentioned above, in some examples, each of the K sets of GNSS channels of GNSS receiver 200 may include 20 GNSS channels. In these examples, the accumulation window of accumulation adder 390 may have a length of 20 milliseconds to correspond to the length of a bit of the navigation message. Additionally, the accumulation adder 390 of each GNSS channel within the same set of GNSS channels may be configured such that their accumulation windows are separated by 1 millisecond. In other words, the accumulation adder 390 of each GNSS channel within the same set of GNSS channels may have a different code offset that is offset by 1023 bits relative to the the accumulation adder 390 of other GNSS channels within the same set of GNSS channels. In this way, one accumulation adder 390 of a GNSS channel may be configured to integrate the Iphase component output by accumulation adder 320 over each of the 20 possible bit-edge timing possibilities.

Figure 4:
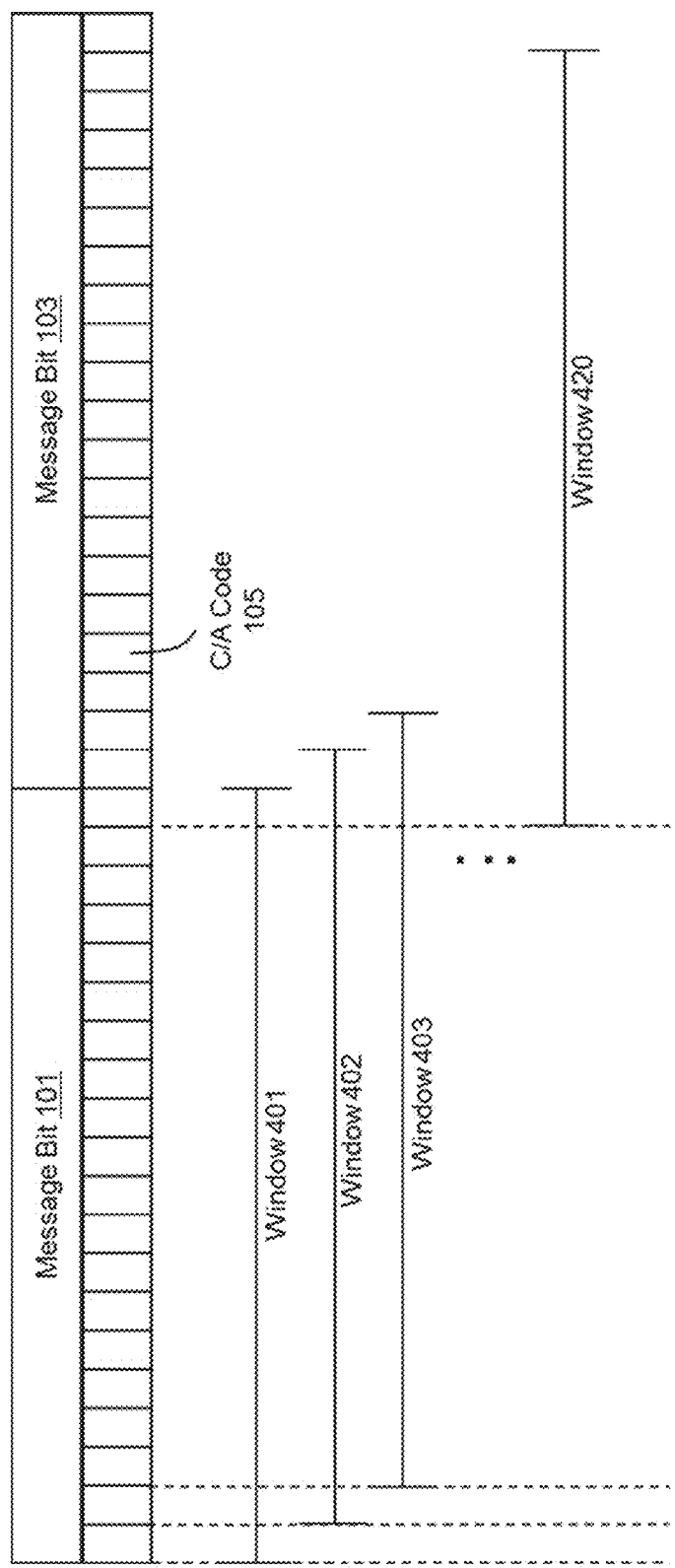
FIG. 4 illustrates a visual representation of various accumulation windows that may be used to detect a navigation message bit.

FIG. 4 shows a visual representation of the 20 accumulation windows 401-420 over which the accumulation adders 390 of the GNSS channels within the same set of GNSS channels may be configured to integrate. As shown, the accumulation windows 401-420 may include each of the 20 possible bit-edge timing possibilities of the navigation message bits. Thus, from the time the 20 GNSS channels begin processing the received GNSS signals, an accumulation adders 390 of one of the 20 GNSS channels may be configured to integrate the Iphase signal using the correct bit-edge timing (in this example, the accumulation adder having accumulation window 401). While not shown, it should be appreciated that the accumulation adders 390 may be configured to repeatedly integrate the Iphase signal over another window of time after the conclusion of the previous window. For example, the accumulation adder having accumulation window 401 may integrate the Iphase signal over another 20 millisecond window after window 401 that corresponds to message bit 103.

Figure 5:
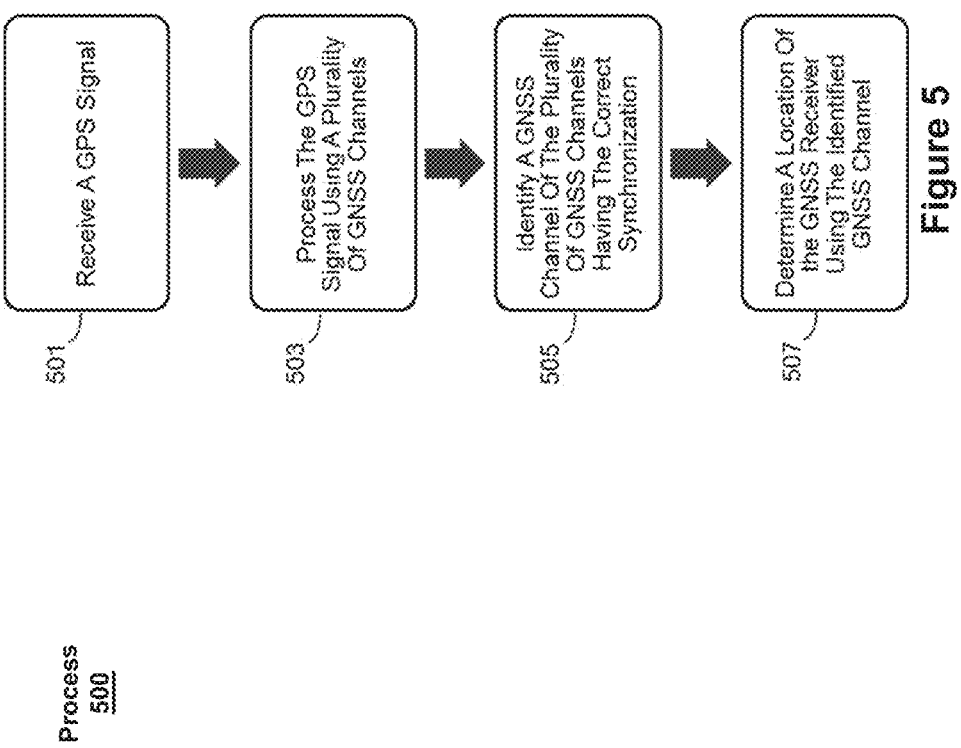
FIG. 5 illustrates an exemplary process for synchronizing a GNSS receiver with a GNSS signal according to various examples.

FIG. 5 illustrates an exemplary process 500 for synchronizing a GNSS receiver with a GNSS signal. In some examples, process 500 may be performed using a GNSS receiver similar or identical to GNSS receiver 200.

At block 501, a GPS signal may be received. In some examples, the GPS signal (e.g., the GPS signal represented by FIG. 1) may be received by an antenna (e.g., antenna 201) of the GNSS receiver. The GPS signal may include two PN code components: a C/A code and a P-code residing on orthogonal carrier components, which may be used by a GNSS receiver to determine the position of the receiver. The GPS signal may further include navigation message bits modulated over both the C/A code and P-code components. The received GPS signal may be processed using RF front-end circuitry of the GNSS receiver. For example, the GPS signal may be amplified using an amplifier (e.g., low noise amplifier 205) to amplify the received GPS signal. The amplified GPS signal may be down-converted to baseband (or another intermediate frequency that depends on the entire receiver frequency plan design and available electronic components) using an oscillator (e.g., oscillator 207), a frequency synthesizer (e.g., frequency synthesizer 209), and a down-converter (e.g., down-converter 211). In some examples, an automatic gain control (e.g., AGC 213) may be used to adjust the amount of gain applied to the down-converted GPS signals to a suitable level. The down-converted GPS signals may also be converted from analog form to digital form using an analog-to-digital converter (e.g., ADC 215).

At block 503, the GPS signal (e.g., after being processed by the RF front-end circuitry) may be received by a plurality of GNSS channels of the GNSS receiver where they may be processed to detect the C/A code, P-code, and navigation message bits that are to be used to determine a position of the GNSS receiver. In some examples, the plurality of GNSS channels may form one of K sets of GNSS channels (e.g., the K sets of N GNSS channels shown in FIG. 2). Each of the K sets of GNSS channels may be configured to process signals from a different GNSS satellite by demodulating the received GNSS signal using a frequency corresponding to the associate satellite. Within each of the K sets of GNSS channels, the plurality of GNSS channels may be configured to demodulate the received GNSS signal to detect the C/A code, P-code, and navigation message bits within the received GNSS signal that are to be used to determine a position of the GNSS receiver, as discussed above with respect to FIG. 3.

In some examples, each set of the K sets of GNSS channels may include 20 GNSS channels that are each configured to integrate the Iphase signal of the received GPS signal over a segment or window of time that is delayed or offset relative to the segments of time of the other GNSS channels, as discussed above with respect to FIGS. 3 and 4. For example, each GNSS channel may be configured to integrate the Iphase signal over a 20 millisecond window of time to correspond to the length of a bit of a navigation message of the GPS signal. The windows of time for the 20 GNSS channels may each be delayed by 1 millisecond relative to the other GNSS channels within the same set of GNSS channels such that collectively, the 20 GNSS channels are configured to integrate over the 20 possible bit-edge timing possibilities for the navigation message bit (e.g., as shown in FIG. 4). Since the 20 GNSS channels may process the received GPS signal at the same time to integrate the Iphase signal of the received GPS signal over all 20 possible bit-edge timing possibilities, one of the channels will be properly synced with the navigation message of the GPS signal.

At block 505, the GNSS channel of the GNSS receiver that is properly synced with the navigation message of the GPS signal may be identified. In some examples, this may include determining (e.g., by microprocessor 260) a power of the navigation message bit output by each of the plurality of GNSS channels by calculating a square of the 20 millisecond accumulations. The determined powers for the navigation message bits output by the plurality of GNSS channels may be compared over one or more bit durations or accumulation windows to identify the GNSS channel that outputs the navigation message bit with the highest determined power. The GNSS channel that outputs the navigation message bit with the highest determined power may be determined to be the GNSS channel that is properly synced with the navigation message of the GPS signal. In other examples, other techniques for identifying the GNSS channel that is properly synced with the navigation message of the GPS signal may be used.

At block 507, the location of the GNSS receiver may be determined, as discussed above, using outputs from the GNSS channel identified at block 505.

Using process 500, a GNSS receiver may determine its location more quickly as the receiver is not required to identify the correct navigation message bit-edges before integrating the signal to obtain the navigation message bits since the receiver includes a channel dedicated to each of the 20 possible bit-edge timings. Moreover, the GNSS channel that is properly synced with the GPS signal may acquire the GPS signal more quickly and may be capable of acquiring the GPS signal when the signal to noise ratio is lower.

Figure 6:
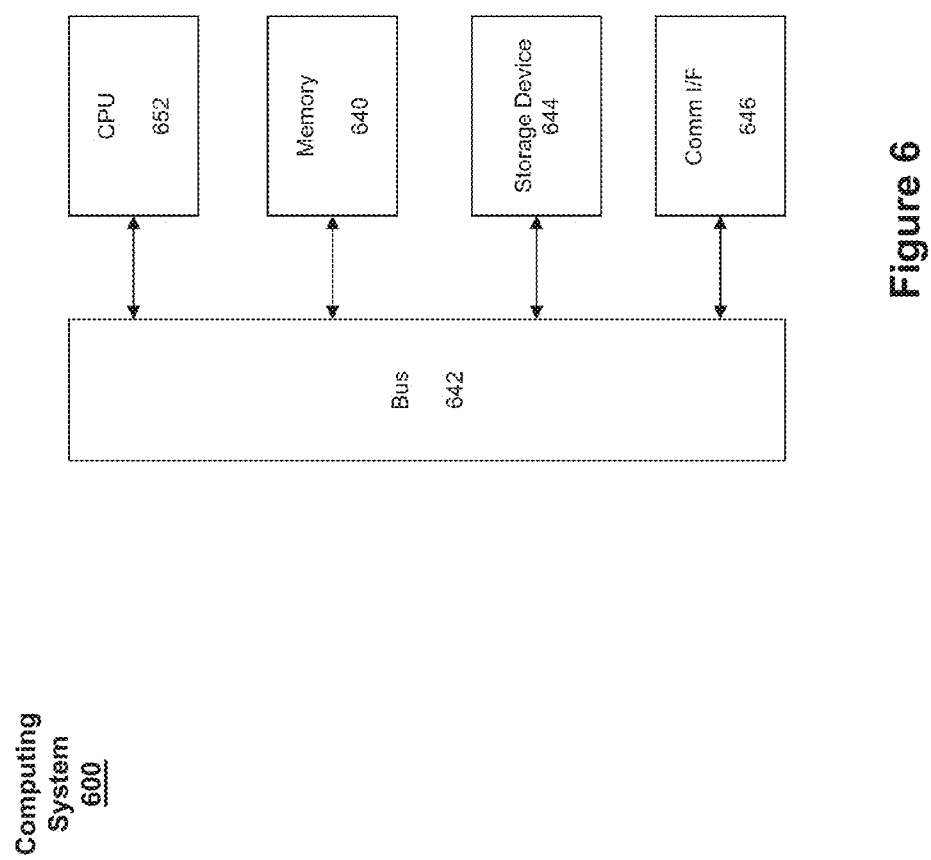
FIG. 6 illustrates an exemplary computing system.

FIG. 6 illustrates an example computing system 600 that may be used to implement some or all of the processing functionality described herein. For example, computing system 600 may be used to implement microprocessor 260 and its associated functions. Computing system 600 may include processor-executable instructions for synchronizing a GNSS receiver with a GNSS signal stored in memory 640. The instructions, executable by CPU 652, may include instructions for determining a strength of a navigation message bit output by a GNSS channel and for comparing the determined strength with the strengths of navigation message bits output by other GNSS channels. Memory 640 may be read only memory ("ROM") or other static storage device coupled to bus 642 for storing static information and instructions for CPU 652. Memory 640 may also be random access memory (RAM) or other dynamic memory, for storing information and instructions to be executed by CPU 652. Memory 640 also may be used for storing temporary variables or other intermediate information during execution of instructions to be executed by CPU 652.

Computing system 600 may include one or more processors, such as a CPU 652. However, those skilled in the relevant art will also recognize how to implement the current technology using other computer systems or architectures. CPU 652 can be implemented using a general or special purpose processing engine such as, for example, a microprocessor, microcontroller or other control logic. In this example, CPU 652 is connected to a bus 642 or other communication medium. The CPU 652 may be operably connected to the GNSS channels of GNSS receiver 200 via bus 642, to receive the channel output vectors and navigation message bits, and to provide frequency/phase control signals to the GNSS channels.

Computing system 600 may include an information storage device 644. The information storage device may include, for example, a media drive (not shown) and a removable storage interface (not shown). The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a non-transitory computer-readable storage medium having stored therein particular computer software or data.

In other examples, information storage device 644 may include other similar instrumentalities for allowing computer programs or other instructions or data to be loaded into computing system 600. Such instrumentalities may include, for example, a removable storage unit (not shown) and an interface (not shown), such as a program cartridge and cartridge interface, a removable memory (for example, a flash memory or other removable memory module) and memory slot, and other removable storage units and interfaces that allow software and data to be transferred from the removable storage unit to computing system 600.

Computing system 600 can also include a communications interface 646. Communications interface 646 can be used to allow software and data to be transferred between computing system 600 and external devices. Examples of communications interface 646 can include a modem, a network interface (such as an Ethernet or other NIC card), a communications port (such as for example, a USB port), a PCMCIA slot and card, etc.

In this document, the terms "computer program product" and "non-transitory computer-readable storage medium" may be used generally to refer to media such as, for example, memory 640, storage media, or removable storage unit. These and other forms of computer-readable media may be involved in providing one or more sequences of one or more instructions to CPU 652 for execution. Such instructions, generally referred to as "computer program code" (which may be grouped in the form of computer programs or other groupings), when executed, enable the computing system 600 to perform features or functions of examples of the current technology.

In one example where the elements are implemented using software, the software may be stored in a non-transitory computer-readable storage medium. The control logic (in this example, software instructions or computer program code), when executed by the CPU 652, causes the CPU 652 to perform the functions of the technology as described herein. For example, the instructions, when executed by CPU 652, may cause CPU 652 to perform some or all of process 500.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A global navigation satellite system (GNSS) receiver, the receiver comprising:
    an antenna configured to receive a GNSS signal;
    a first plurality of GNSS channels coupled to receive the GNSS signal, wherein each of the first plurality of GNSS channels is configured to integrate the GNSS signal over an accumulation window having a predetermined length of time to output a navigation message bit, and wherein the accumulation windows of the first plurality of GNSS channels are delayed relative to each other;
    a second plurality of GNSS channels coupled to receive the GNSS signal, wherein each of the second plurality of GNSS channels is configured to integrate the GNSS signal over an accumulation window having the predetermined length of time to output a navigation message bit, and wherein the accumulation windows of the second plurality of GNSS channels are delayed relative to each other; and
    a processor coupled to receive the navigation message bits from the first plurality of GNSS channels, wherein the processor is configured to identify one of the first plurality of GNSS channels that is synchronized with the GNSS signal based on the navigation message bits.

2. The GNSS receiver of claim 1, wherein the first plurality of GNSS channels comprises 20 GNSS channels.

3. The GNSS receiver of claim 2, wherein the predetermined length of time is 20 milliseconds.

4. The GNSS receiver of claim 3, wherein the accumulation windows of the first plurality of GNSS channels are delayed relative to each other by 1 millisecond.

5. The GNSS receiver of claim 1, wherein each GNSS channel of the first plurality of GNSS channels are configured to demodulate the GNSS signal to produce an in-phase (Iphase) signal, and wherein integrating the GNSS signal over the accumulation window comprises integrating the Iphase signal over the accumulation window.

6. The GNSS receiver of claim 1, wherein identifying one of the first plurality of GNSS channels that is synchronized with the GNSS signal based on the navigation message bits comprises:
    determining a power of each of the navigation message bits from the first plurality of GNSS channels; and
    identifying the one of the first plurality of GNSS channels that is synchronized with the GNSS signal by identifying the GNSS channel outputting the navigation message bit having the highest power.

7. The GNSS receiver of claim 1, wherein the second plurality of GNSS channels comprises 20 GNSS channels.

8. The GNSS receiver of claim 1, wherein the accumulation windows of the second plurality of GNSS channels are delayed relative to each other by 1 millisecond.

9. The GNSS receiver of claim 1, wherein the first plurality of GNSS channels are configured to process signals from a first satellite, and wherein the second plurality of GNSS channels are configured to process signals from a second satellite.

10. A method for synchronizing a global navigation satellite system (GNSS) receiver with a GNSS signal, the method comprising:
    receiving, at an antenna, the GNSS signal;
    integrating, by each of a first plurality of GNSS channels, the GNSS signal over an accumulation window having a predetermined length of time to output a navigation message bit, wherein the accumulation windows of the first plurality of GNSS channels are delayed relative to each other;

integrating, by each of a second plurality of GNSS channels, the GNSS signal over an accumulation window having the predetermined length of time to output a navigation message bit, wherein the accumulation windows of the second plurality of GNSS channels are delayed relative to each other; and identifying one of the first plurality of GNSS channels that is synchronized with the GNSS signal based on the navigation message bits.

11. The method of claim 10, wherein the first plurality of GNSS channels comprises 20 GNSS channels.

12. The method of claim 11, wherein the predetermined length of time is 20 milliseconds.

13. The method of claim 12, wherein the accumulation windows of the first plurality of GNSS channels are delayed relative to each other by 1 millisecond.

14. The method of claim 10, further comprising demodulating, by each of the first plurality of GNSS channels, the GNSS signal to produce an in-phase (Iphase) signal, wherein integrating, by each of the first plurality of GNSS channels, the GNSS signal over the accumulation window comprises integrating, by each of the first plurality of GNSS channels, the Iphase signal over the accumulation window.

15. The method of claim 10, wherein identifying one of the first plurality of GNSS channels that is synchronized with the GNSS signal based on the navigation message bits comprises:

determining a power of each of the navigation message bits from the first plurality of GNSS channels; and identifying the one of the first plurality of GNSS channels that is synchronized with the GNSS signal by identifying the GNSS channel outputting the navigation message bit having the highest power.

16. The method of claim 10, wherein the second plurality of GNSS channels comprises 20 GNSS channels.

17. The method of claim 10, wherein the accumulation windows of the second plurality of GNSS channels are delayed relative to each other by 1 millisecond.

18. The method of claim 10, wherein the first plurality of GNSS channels are configured to process signals from a first satellite, and wherein the second plurality of GNSS channels are configured to process signals from a second satellite.

* * * * *